(12) United States Patent
Bosscher et al.

(10) Patent No.: US 8,965,620 B2
(45) Date of Patent: Feb. 24, 2015

(54) SYSTEMS AND METHODS FOR CONTROLLING MOVEMENT OF UNMANNED VEHICLES

(71) Applicant: Harris Corporation, Melbourne, FL (US)

(72) Inventors: Paul M. Bosscher, West Melbourne, FL (US); Matthew D. Summer, Melbourne, FL (US); Loran J. Wilkinson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 231 days.

(21) Appl. No.: 13/761,321

(22) Filed: Feb. 7, 2013

(65) Prior Publication Data

US 2014/0222276 A1    Aug. 7, 2014

(51) Int. Cl.
*G05D 1/00* (2006.01)
*G01C 22/00* (2006.01)
*G05D 1/02* (2006.01)

(52) U.S. Cl.
CPC .............. *G05D 1/0016* (2013.01); *G05D 1/021* (2013.01); *G05D 2201/0207* (2013.01)
USPC ............................................ 701/23; 700/259

(58) Field of Classification Search
USPC ............ 701/1, 2, 23, 300, 400; 700/245, 259; 901/1, 47
See application file for complete search history.

(56) References Cited

U.S. PATENT DOCUMENTS

| | | | |
|---|---|---|---|
| 3,280,991 A | 10/1966 | Melton | |
| 3,637,092 A | 1/1972 | George et al. | |
| 4,216,467 A | 8/1980 | Colston | |
| 4,521,685 A | 6/1985 | Rebman | |
| 4,604,016 A | 8/1986 | Joyce | |
| 4,655,673 A | 4/1987 | Hawkes | |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

Alqasemi R et al: "Kinematics, control and redundancy resolution of a 9-DoF wheelchair-mounted robotic arm system for ADL tasks", Mechatronics and Its Applications, 2009. ISMA '09. 6th International Symposium on, IEEE, Piscataway, NJ, USA, Mar. 23, 2009, pp. 1-7.

(Continued)

*Primary Examiner* — Mary Cheung
(74) *Attorney, Agent, or Firm* — Robert J. Sacco, Esq.; Fox Rothschild LLP (57) ABSTRACT

Control units (10) for use with unmanned vehicles (12) include an input device (50) that moves in response to a user input, sensors (70) coupled to the input device (50), and a controller (16). The sensors (70) generate outputs related to the movement of the input device (50). The controller (16) determines a target displacement of the unmanned vehicle (12) based on the outputs of the sensors (70), and generates a control input related to the target displacement. The control input, when received by the unmanned vehicle (12), causes the unmanned vehicle (12) to substantially attain the target displacement. The position of the vehicle (12) is thus controlled by directly controlling the displacement of the vehicle (12).

23 Claims, 10 Drawing Sheets

(56) References Cited

U.S. PATENT DOCUMENTS

| | | | |
|---|---|---|---|
| 4,661,032 A | 4/1987 | Arai | |
| 4,762,006 A | 8/1988 | Asakawa et al. | |
| 4,791,588 A | 12/1988 | Onda et al. | |
| 4,795,296 A | 1/1989 | Jau | |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,981 A | 1/1990 | Yoshinada et al. | |
| 4,975,856 A | 12/1990 | Vold et al. | |
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,184,319 A | 2/1993 | Kramer | |
| 5,193,963 A | 3/1993 | McAffee et al. | |
| 5,231,693 A | 7/1993 | Backes et al. | |
| 5,382,885 A | 1/1995 | Salcudean et al. | |
| 5,413,454 A | 5/1995 | Movsesian | |
| 5,430,643 A | 7/1995 | Seraji | |
| 5,451,924 A | 9/1995 | Massimino et al. | |
| 5,508,596 A | 4/1996 | Olsen | |
| 5,565,891 A | 10/1996 | Armstrong | |
| 5,589,828 A | 12/1996 | Armstrong | |
| 5,619,180 A | 4/1997 | Massimino et al. | |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A | 11/1998 | Jacobus et al. | |
| 6,028,593 A | 2/2000 | Rosenberg et al. | |
| 6,047,610 A | 4/2000 | Stocco et al. | |
| 6,084,587 A | 7/2000 | Tarr et al. | |
| 6,088,017 A | 7/2000 | Tremblay et al. | |
| 6,104,158 A | 8/2000 | Jacobus et al. | |
| 6,184,868 B1 | 2/2001 | Shahoian et al. | |
| 6,191,796 B1 | 2/2001 | Tarr | |
| 6,246,390 B1 | 6/2001 | Rosenberg | |
| 6,271,833 B1 | 8/2001 | Rosenberg et al. | |
| 6,281,651 B1 | 8/2001 | Haanpaa et al. | |
| 6,522,952 B1 | 2/2003 | Arai et al. | |
| 6,535,793 B2 | 3/2003 | Allard | |
| 6,592,315 B2 | 7/2003 | Osborne, Jr. | |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 | 9/2004 | Sanchez et al. | |
| 6,801,008 B1 | 10/2004 | Jacobus et al. | |
| 6,857,878 B1 | 2/2005 | Chosack et al. | |
| 7,138,981 B2 | 11/2006 | Kim et al. | |
| 7,158,112 B2 | 1/2007 | Rosenberg et al. | |
| 7,168,748 B2 | 1/2007 | Townsend et al. | |
| 7,208,900 B2 | 4/2007 | Carlson et al. | |
| 7,225,404 B1 | 5/2007 | Zilles et al. | |
| 7,345,672 B2 | 3/2008 | Jacobus et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 | 4/2011 | Sjoberg et al. | |
| 8,226,072 B2 | 7/2012 | Murayama | |
| 8,373,391 B1 | 2/2013 | Allen et al. | |
| 8,447,440 B2 | 5/2013 | Phillips et al. | |
| 8,473,101 B2 | 6/2013 | Summer | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 | 12/2004 | Riener et al. | |
| 2005/0087373 A1 | 4/2005 | Wakitani et al. | |
| 2005/0252329 A1 | 11/2005 | Demers | |
| 2006/0048364 A1 | 3/2006 | Zhang et al. | |
| 2006/0066574 A1 | 3/2006 | Kim et al. | |
| 2006/0117258 A1 | 6/2006 | Yu | |
| 2006/0178775 A1 | 8/2006 | Zhang et al. | |
| 2007/0013336 A1 | 1/2007 | Nowlin et al. | |
| 2007/0050139 A1 | 3/2007 | Sidman | |
| 2007/0095582 A1 | 5/2007 | Stuijt et al. | |
| 2008/0009971 A1 | 1/2008 | Kim et al. | |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 | 3/2009 | Dariush et al. | |
| 2009/0182436 A1 | 7/2009 | Ferrara | |
| 2009/0234499 A1* | 9/2009 | Nielsen et al. | 700/250 |
| 2010/0019890 A1 | 1/2010 | Helmer et al. | |
| 2010/0023185 A1* | 1/2010 | Terwelp et al. | 701/2 |
| 2010/0041991 A1 | 2/2010 | Roundhill | |
| 2010/0070079 A1 | 3/2010 | Mangaser et al. | |
| 2010/0084513 A1* | 4/2010 | Gariepy et al. | 244/190 |
| 2010/0092267 A1 | 4/2010 | Najdovski et al. | |
| 2010/0100256 A1 | 4/2010 | Jurmain et al. | |
| 2010/0168918 A1 | 7/2010 | Zhao et al. | |
| 2010/0169815 A1 | 7/2010 | Zhao et al. | |
| 2010/0172733 A1 | 7/2010 | Chalubert et al. | |
| 2010/0259614 A1* | 10/2010 | Chen | 348/148 |
| 2011/0015569 A1 | 1/2011 | Kirschenman et al. | |
| 2011/0046781 A1 | 2/2011 | Summer | |
| 2011/0106339 A1* | 5/2011 | Phillips et al. | 701/2 |
| 2011/0144828 A1* | 6/2011 | Chengalva | 701/2 |
| 2011/0155785 A1 | 6/2011 | Laurent et al. | |
| 2011/0257786 A1 | 10/2011 | L'Ecuyer et al. | |
| 2012/0095619 A1* | 4/2012 | Pack et al. | 701/2 |
| 2012/0150351 A1 | 6/2012 | Bosscher et al. | |
| 2012/0184955 A1 | 7/2012 | Pivotto et al. | |
| 2012/0185098 A1 | 7/2012 | Bosscher et al. | |
| 2012/0185099 A1 | 7/2012 | Bosscher et al. | |
| 2012/0294696 A1* | 11/2012 | Summer et al. | 414/1 |
| 2012/0306741 A1* | 12/2012 | Gupta | 345/156 |
| 2013/0328770 A1 | 12/2013 | Parham | |
| 2014/0031983 A1 | 1/2014 | Low et al. | |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 A1 | 7/2003 |
| WO | 2006 016799 A1 | 2/2006 |
| WO | 2007051000 A2 | 5/2007 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.

International Search Report mailed May 2, 2013, International Application No. PCT/US2012/051314, in the name of Harris Corporation.

Tijsma, H.A. et al., A Framework of Interface Improvements for Designing New User Interfaces for the MANUS Robot Arm, Proceedings of the 2005 IEEE, 2005, 235-240.

Rocco, Ana Catalina Torres, Development and testing of a new C-based algoithm to control a 9-degree-of-freedom wheelchair-mounted-robotic-arm system, University of South Florida, Jun. 1, 2010.

International Search Report mailed May 12, 2014, Applicaiton Serial No. PCT/US2013/069071, in the name of Harris Corporation.

Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.

(56) References Cited

OTHER PUBLICATIONS

Information about Related Patents and Patent Applications, see section 6 of the accompanying Information Disclosure Statement Letter, which concerns Related Patents and Patent Applications, date various from 2011-2013.
European Search Report mailed Mar. 14, 2012, Application Serial No. 11009319.2-2316, in the name of Harris Corporation.
Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.
Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.
Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.
Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.
International Search Report mailed May 23, 2012; Application Serial No. PCT/US2011/066873 in the name of Harris Corporation.
Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.
Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L Eee/RSJ International Conference on Osaka, Japan, Nov. 4-8, 1996, New York, NY, USA, IEEE, US, vol. 2, 4, Nov. 1996, pp. 425-430, XP010212433.
Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.
International Search Report mailed Jun. 28, 2012, Application Serial No. PCT/US2012/027475 in the name of Harris Corporation.
Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.
International Search Report dated Oct. 29, 2012; Application Serial No. PCT/US2012/034207 in the name of Harris Corporation.
International Search Report dated Jan. 15, 2013, Application Serial No. PCT/US2012/037751 in the name of Harris Corporation.
International Search Report mailed Jan. 4, 2013, International Application Serial No. PCT/US2012/058303 in the name of Harris Corporation.
Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.
Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.
Information about Related Patents and Patent Applications, see section 6 of the accompanying Information Disclosure Statement Letter, which concerns Related Patents and Patent Applications, 2013.
Torres Rocco, A.C., "Development and testing of a new C-based algorithm to control 9-degree-of-freedom wheelchair-mounted-robotic-arm system". Jun. 1, 2010, Univ. of So. Florida.
Alqasemi, R., et al., "Maximizing Manipulation Capabilities for People with Disabilities Using 9-DoF Wheelchair-Mounted Robotic Arm System", 2007, IEEE.

\* cited by examiner

SYSTEMS AND METHODS FOR CONTROLLING MOVEMENT OF UNMANNED VEHICLES

BACKGROUND

1. Statement of the Technical Field

The inventive concepts relate to unmanned vehicles, such as unmanned ground vehicles ("UGVs"), configured to operate in response to commands from a remotely-located control unit.

2. Description of Related Art

Unmanned vehicles are motorized vehicles that operate without an on-board human presence. Remotely-controlled and remotely-guided unmanned vehicles, such as UGVs, are in widespread use in applications such as explosive ordinance disposal ("EOD"), search and rescue operations, hazardous material disposal, surveillance, etc. A typical UGV can include, for example, a frame or chassis, wheels and drive motors mounted on the chassis, an articulating arm mounted on top of the chassis, and grippers and a camera mounted on the arm. UGVs can be equipped with steerable front wheels to facilitate directional control. Alternatively, UGVs can include tracks that facilitate operation over rough terrain. Steering of tracked UGVs can be effectuated, for example, by simultaneously operating the wheels on opposite sides of the UGV in opposite directions.

Movement and steering of a UGV, and operation of its robotic arm, grippers, camera, and other accessories can be controlled by a user from a location remote from the UGV, using a joystick-equipped control unit that communicates with the UGV by way of a wireless communication link. Movement of the UGV is typically controlled by modulating the velocity of UGV in proportion to the displacement of the joystick or other input device of the control unit.

UGVs are often used indoors, in low-light and other limited-visibility conditions, and in small areas with limited maneuvering room. Also, a UGV may need to be maneuvered near and around obstacles and hazards such as live ordinance or radioactive material. In many applications, velocity control may not be able to provide the relatively high degree maneuverability necessitated by these operational requirements. For example, it can be difficult to precisely modulate the speed of a UGV, and its resulting position change, using a joystick controller, due to the relatively short range of travel of a typical joystick. Moreover, it can be difficult for a user to recognize and then command the precise velocity needed to position the UGV in a desired position. Thus, a user typically needs to "creep-up" on the final desired position of the UGV by repeatedly jogging the joystick or other input device as the UGV approaches the desired position, to facilitate the final movement of the UGV in small, discrete increments. Moreover, the imprecision associated with velocity control can increase the potential for the UGV to overshoot the desired position and collide with the object being examined or manipulated.

SUMMARY OF THE INVENTION

Embodiments of systems include an unmanned vehicle and a control unit communicatively coupled to the unmanned vehicle. The unmanned vehicle has a body, and a movable element such a plurality of wheels capable of rotating in relation to the body. The unmanned vehicle also includes an actuating device, such as a motor operable to rotate the wheels, and a first controller. The first controller communicates with the actuating device, and is operable to activate and deactivate the actuating device in response to control inputs generated by the control unit.

The control unit includes an input device configured to move in response to a user input, sensor operable to sense movement of the input device, and a second controller that communicates with the sensor. The second controller is operable to determine a displacement of the input device based on inputs from the sensor, determine a target displacement of the unmanned vehicle based on a relationship between the displacement of the input device and the target displacement of the unmanned vehicle, and generate the control inputs for the unmanned vehicle. The control inputs, when received by the unmanned vehicle, cause the unmanned vehicle to substantially attain the target displacement.

Methods for controlling a position of an unmanned vehicle include moving an input device of a control unit communicatively coupled to the unmanned vehicle so that the control unit determines a target displacement of the unmanned vehicle based on the movement of the input device, and generates a control input that, when received by the unmanned vehicle, causes the unmanned vehicle to substantially attain the target displacement.

BRIEF DESCRIPTION OF THE DRAWINGS

Embodiments will be described with reference to the following drawing figures, in which like numerals represent like items throughout the figures and in which.

DETAILED DESCRIPTION

The inventive concepts are described with reference to the attached figures. The figures are not drawn to scale and they are provided merely to illustrate the instant inventive concepts. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts. The inventive concepts is not limited by the illustrated ordering of acts or events, as some acts may occur in different orders and/or concurrently with other acts or events. Furthermore, not all illustrated acts or events are required to implement a methodology in accordance with the inventive concepts. As used herein, the singular forms "a", "an" and "the" are intended to include the plural forms as well, unless the context clearly indicates otherwise.

The figures depict a control unit 10, and a remotely-controlled vehicle in the form of an unmanned ground vehicle 12. The control unit 10 is configured to permit a user to control the movement and other operations of the vehicle 12 from a location remote from the vehicle 12. The inventive concepts are described herein in connection with an unmanned ground vehicle for exemplary purposes only; the inventive concepts can be applied to other types of remotely-controlled and remotely-guided unmanned vehicles, such as unmanned aerial vehicles, including unmanned rotary-wing vehicles and unmanned combat air vehicles; unmanned undersea vehicles; unmanned surface vehicles; etc.

Figure 1:
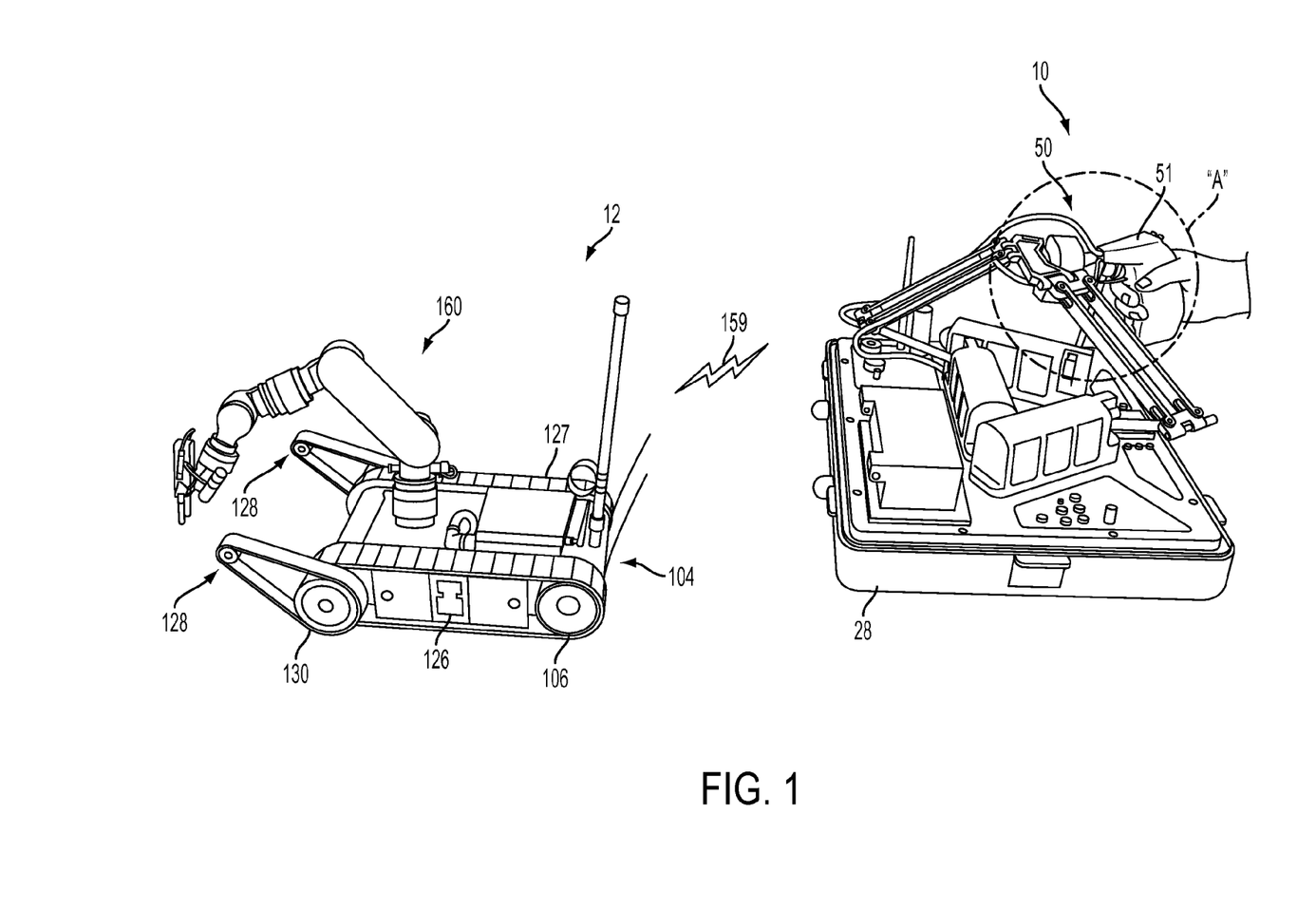
FIG. 1 is a perspective view of an unmanned ground vehicle, and a control unit for controlling the displacement of the vehicle from a remote location.
Figure 2:
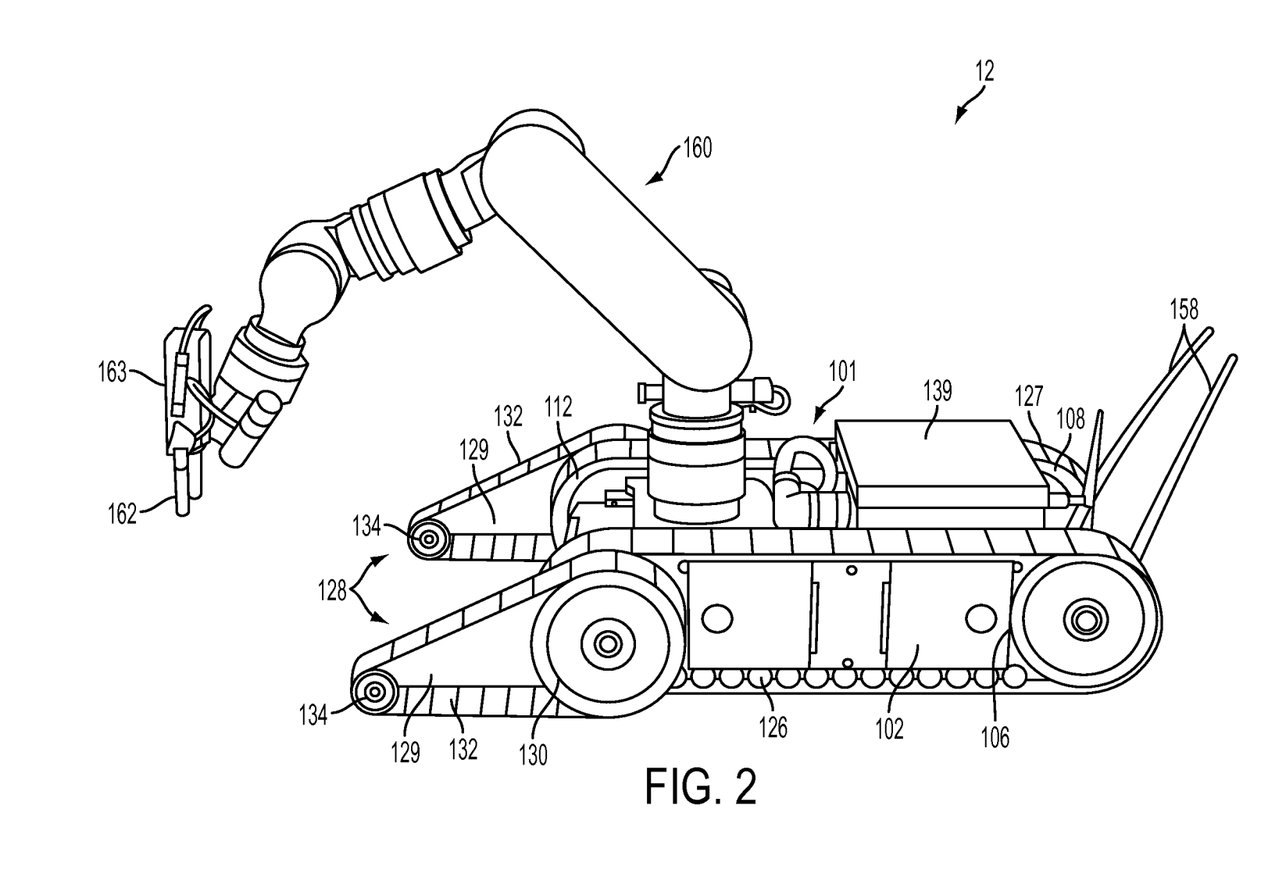
FIG. 2 is a perspective view of the vehicle shown in FIG. 1.
Figure 3:
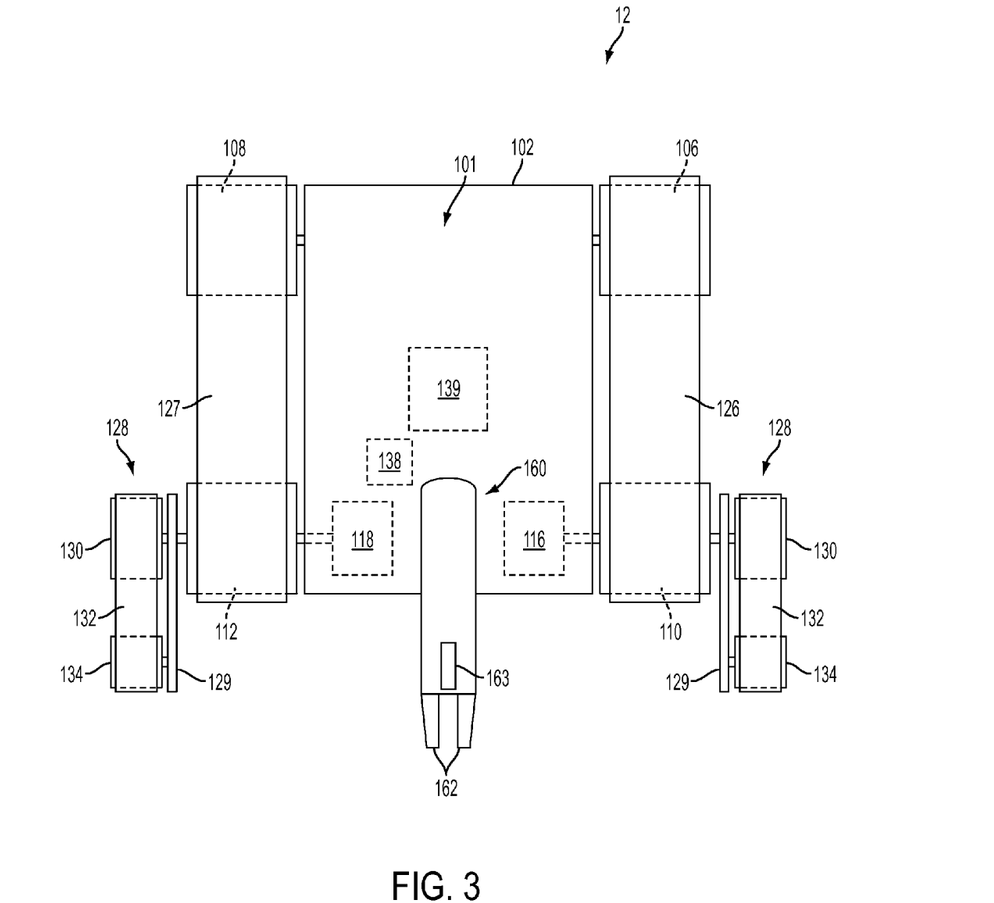
FIG. 3 is a schematic view of the vehicle shown in FIGS. 1 and 2.

The vehicle 12 includes a body 101 comprising a rigid chassis or frame 102, as shown in FIGS. 1-3. The vehicle 12 also includes movable elements in the from of two rear wheels, designated by the respective reference characters 106 and 108, and two front wheels, designated by the respective reference characters 110 and 112. The rear wheels are mounted proximate the rearward end of the frame 102, on opposite sides thereof as shown in FIGS. 1 and 2. The front wheels 110, 112 are mounted proximate the forward end of the frame 102, on opposite sides thereof. In alternative embodiments, the movable elements can be structures other than wheels, such as articulating legs.

Figure 4:
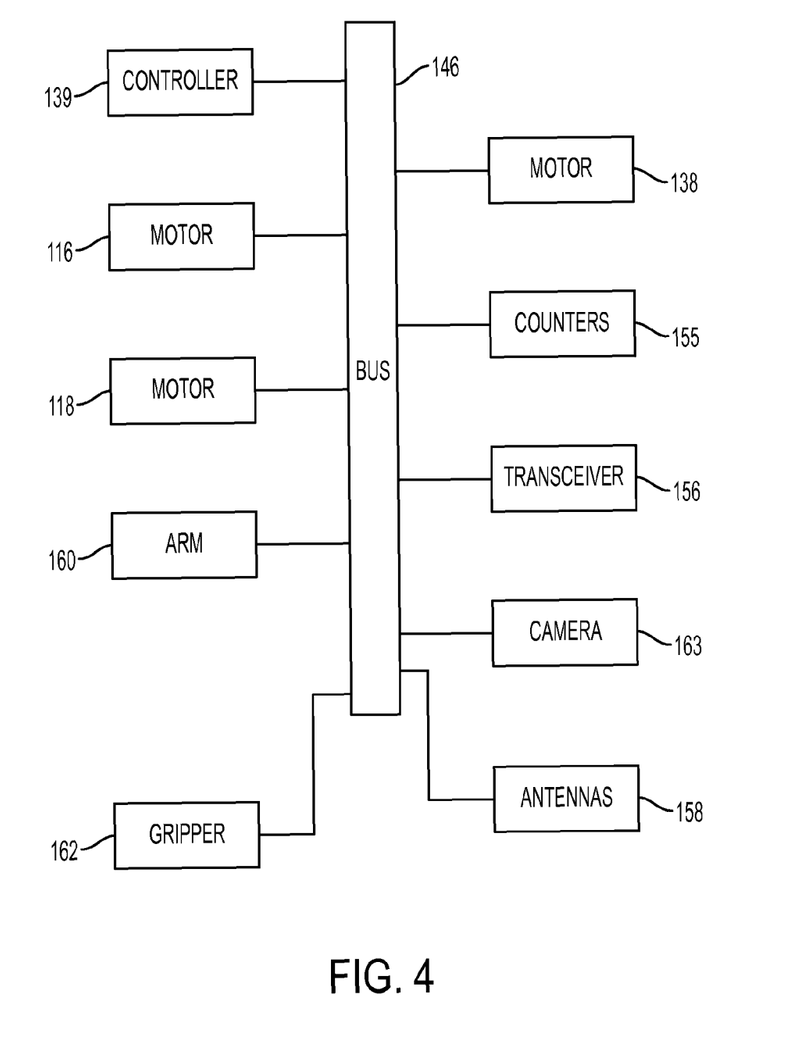
FIG. 4 is a schematic view of various electrical and electronic components of the vehicle shown in FIGS. 1-3.

The vehicle 12 further comprises actuating devices in the form of two variable-speed, reversible electric motors, designated by the respective reference characters 116 and 118, and illustrated schematically in FIGS. 3 and 4. The motors 116, 118 are mounted on the body 101. The motor 116 is coupled to the front wheel 110 so that activation of the motor 116 causes the front wheel 110 to rotate. The motor 118 is coupled to the front wheel 112 so that activation of the motor 118 causes the front wheel 112 to rotate.

The rear wheel 106 and the front wheel 110 are located on the same side of the vehicle 12. as can be seen in FIG. 3. The rear wheel 106 and the front wheel 110 are coupled by way of a tread or track 126, so that rotation of the front wheel 110 drives the track 126, which in turn causes the rear wheel 106 to rotate. The rear wheel 108 and the front wheel 112 are located on the same side of the vehicle 12, as shown in FIG. 3. The rear wheel 108 and the front wheel 112 are coupled by way of a tread or track 127, so that rotation of the front wheel 112 drives the track 127, which in turn causes the rear wheel 108 to rotate. Alternative embodiments can be equipped with additional motors that directly drive the rear wheels 106, 108.

The vehicle 12 further comprises flippers 128 located on opposite sides of the vehicle 12, as shown in FIGS. 1-3. Each flipper 128 includes a rigid frame 129, a drive wheel 130, a track 132, and a secondary wheel 134 mounted for rotation on the frame 129. The drive wheel 130 of a first of the flippers 128 is coupled to the motor 116 by way of the front wheel 110, so that the drive wheel 130 rotates with the front wheel 110. The drive wheel 130 of the other flipper 128 is coupled to the motor 118 by way of the front wheel 112, so that the drive wheel 130 rotates with the front wheel 112.

The drive wheel 130 and the secondary wheel 134 of each flipper 128 are coupled by way of an associated one the tracks 132, so that rotation of the drive wheel 130 drives the secondary wheel 134. The frames 129 are coupled to the frame 102 of the vehicle 12 so that each flipper 128 is capable of rotating between a raised position shown in FIG. 1 and a lowered position shown in FIGS. 2 and 3. The vehicle 12 can be operated with the frames 129 in the raised position when the vehicle 12 is operating over steep or rough terrain, to assist the vehicle 12 in traversing such terrain. Movement of the flipper 128 between the raised and lowered positions can be effectuated by a motor 138 mounted on the body 101 and coupled to frames 129 via a shaft (not shown) or other suitable means. The motor 138 is depicted schematically in FIGS. 3 and 4.

Figure 5:
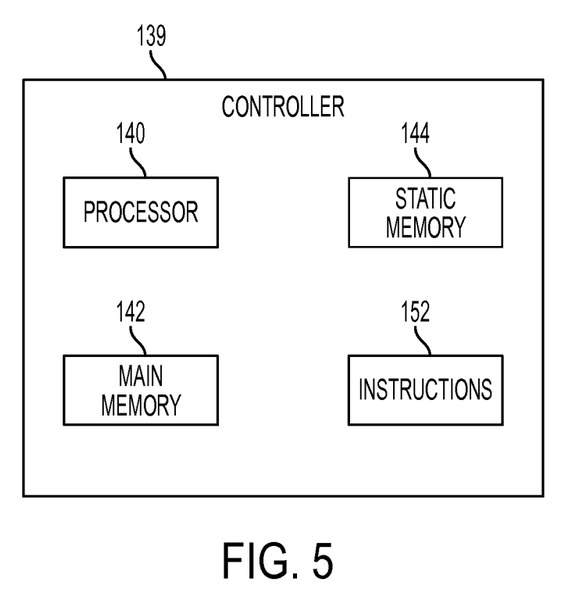
FIG. 5 is a schematic view of a controller of the vehicle shown in FIGS. 1-4.

The vehicle 12 further includes a controller 139. The controller 139 comprises a processor 140, such as a central processing unit (CPU), a main memory 142, and a static memory 144 that communicate with each other via a bus 146, as shown in FIGS. 4 and 5. The static memory 144 stores one or more sets of instructions 152, e.g., software code, configured to implement one or more of the methodologies, procedures, or functions described herein. The instructions 152 are depicted schematically in FIG. 5. The instructions 152 can also reside, completely or at least partially, within the main memory 142 or the processor 140 during execution thereof by the processor 140. The main memory 142 and the processor 140 also can constitute machine-readable media.

Those skilled in the art will appreciate that the computer system architecture illustrated in FIG. 5 is one possible example of computer system architecture for an unmanned vehicle configured in accordance with the inventive concepts disclosed herein. The invention is not limited in this regard, however, and other suitable computer system architecture can also be used without limitation.

The vehicle 12 also includes a displacement-sensing means. The displacement-sensing means can be, for example, two counters 155 that register the number revolutions made by the respective front wheels 110, 112 in the forward and reverse directions. This information is relayed to the controller 139 via the bus 146. The controller 139 calculates the displacement of the vehicle 12 based on a pre-determined relationship between the number of revolutions of the wheels 110, 112 in the forward and reverse directions, and the angular and linear displacement of the vehicle 12. The counters 155 are depicted schematically in FIG. 4. Other displacement-sensing means, such as an accelerometer, a gyroscope, a global-positioning unit, an acoustic device, a rangefinder, a camera, etc., can be used in lieu of the counters.

The vehicle 12 also includes a transceiver 156 communicatively coupled to the processor 140 via the bus 146, as depicted schematically in FIG. 4. The transceiver 156 communicates with the control unit 10 via a suitable wireless communication link such as radio frequency (RF) transmission. The wireless communication link is depicted schematically in FIG. 1, using the reference character 159. Other suitable wireless and wired communication means can be used in alternative embodiments. The vehicle 12 also includes two antennas 158 that facilitate transmission and reception of RF signals to and from the transceiver 156.

The vehicle 12 further includes an articulating arm 160 mounted on the body 101, as illustrated in FIGS. 1-3. The arm 160 is equipped a set of grippers 162 and a camera 163 mounted on the freestanding end thereof. The arm 160, grippers 162, and camera 163 can be remotely controlled via the control unit 10. The use of the vehicle 12 in conjunction with the arm 160, grippers 162, and camera 163 is described for exemplary purposed only. The inventive concepts disclosed and claimed herein can be used in connection with remotely controlled vehicles equipped with other types of accessories, e.g., a sensor package mounted on an articulating or non-articulating arm, a remotely-operated weapon system, etc.

The position of the vehicle 12 is controlled through the selective activation and deactivation of the motors 116, 118, in response to control inputs generated by the control unit 10. Linear or straight-line travel of the vehicle 12 is effectuated by the simultaneous activation of both of the motors 116, 118 in the same direction and at the same speed, to drive both of the tracks 126, 127 the same direction and at the same speed. Turning of the vehicle 12 can be achieved by simultaneously activating the motors 116, 118 in opposite directions, or in the same direction at different speeds; or by operating only one of motors 116, 118. Alternative embodiments of the vehicle 12 can be configured without the tracks 126, 127, and can be equipped with steerable front or rear wheels responsive to directional inputs generated by the control unit 10.

Figure 6:
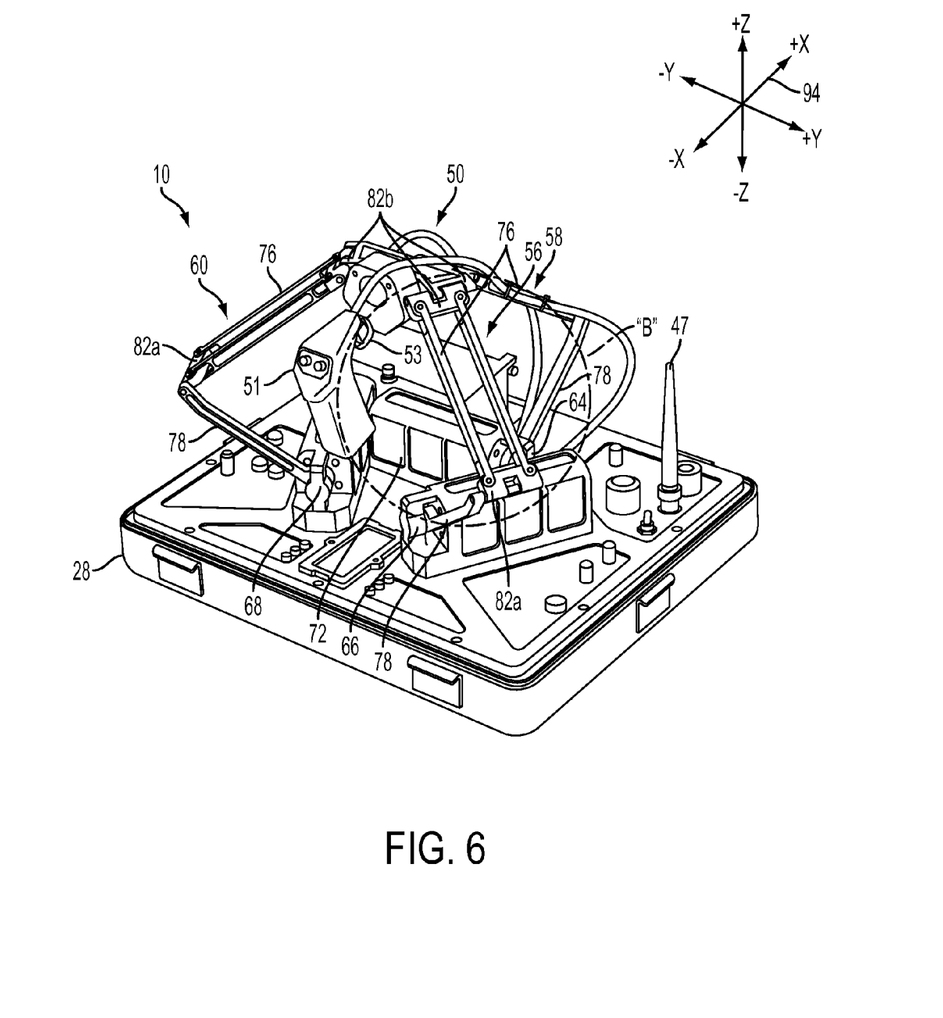
FIG. 6 is a perspective view of the control unit shown in FIG. 1.
Figure 9:
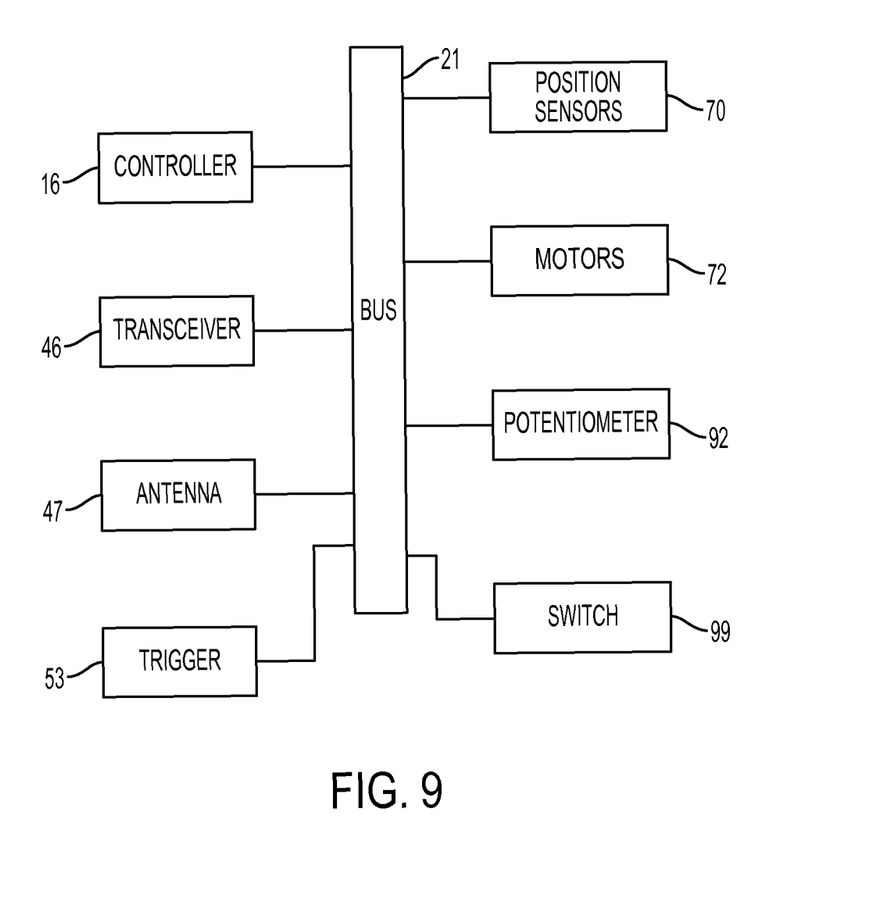
FIG. 9 is a schematic view of various electrical and electronic components of the control unit shown in FIGS. 1 and 6-8.
Figure 10:
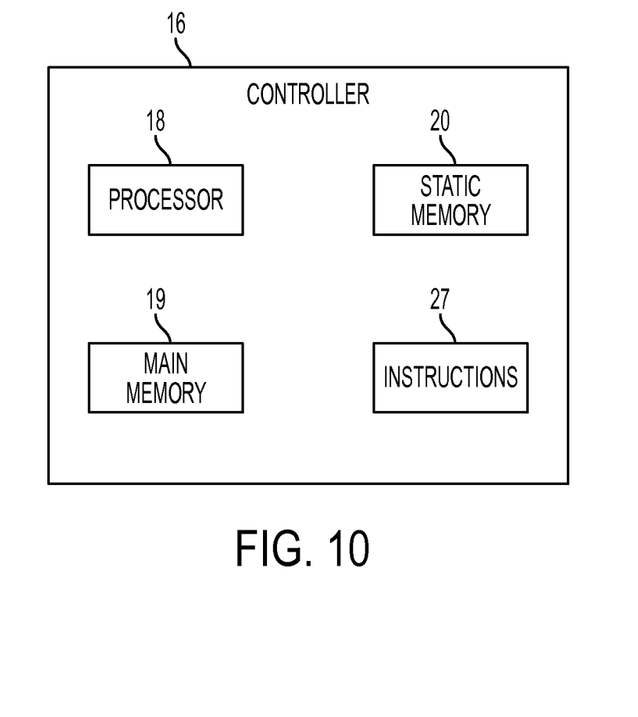
FIG. 10 is a schematic view of a controller of the control unit shown in FIGS. 1 and 6-9.

The control unit 10 comprises a controller 16. The controller 16 includes a processor 18, such as a CPU, a main memory 19, and a static memory 20 which communicate with each other via a bus 21, as shown in FIGS. 9 and 10. The control unit 10 also includes a rigid casing 28 that houses the controller 16, as shown in FIGS. 1 and 6, and a rigid cover (not shown) that can be placed over the exposed components of the control unit 10 when the control unit 10 is not in use.

The static memory 20 stores one or more sets of instructions 27, e.g., software code, configured to implement one or more of the methodologies, procedures, or functions described herein. The instructions 27 are depicted schematically in FIG. 10. The instructions 27 can also reside, completely or at least partially, within the main memory 19 or the processor 18 during execution thereof by the processor 18. The main memory 19 and the processor 18 also can constitute machine-readable media.

The control unit 10 further includes a wireless transceiver 46 communicatively coupled to the controller 16 via the bus 21, as illustrated schematically in FIG. 9. The transceiver 46 communicates with the transceiver 156 of the vehicle 12 via the RF communication link 159. The control unit 10 also includes an antenna 47 that facilitates transmission and reception of RF signals from and to the transceiver 46.

The control unit 10 further comprises an input device 50 for providing user inputs to the controller 50. The input device 50 is shown in FIGS. 1 and 6-8. The input device 50 comprises a hand grip 51, and a first, second, and third linkage designated by the respective reference characters 56, 58, 60. Each of the linkages 58, 60, 62 includes two substantially identical upper bars 76, and a lower bar 78 coupled to the upper bars 76 by way of a coupler 82a. The first, second, and third linkages 56, 58, 60 are each coupled to the hand grip 51 by way of another coupler 82b, as explained in detail below.

Figure 8:
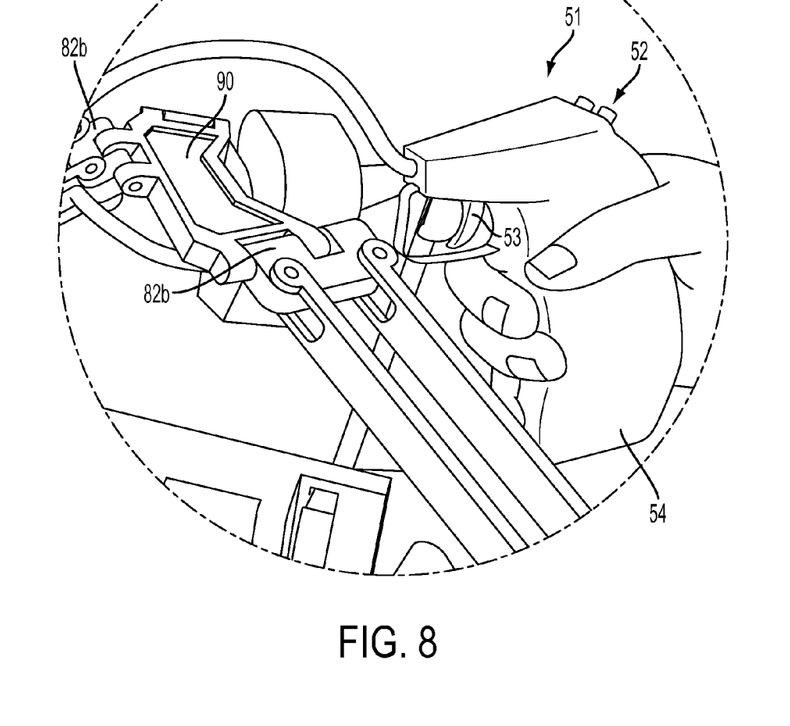
FIG. 8 is a magnified view of the area designated "A" in FIG. 1.

The hand grip 51 includes a body 52, and a trigger 53, as illustrated in FIG. 8. The body 52 has an elongated portion 54 suitable for being grasped by the hand of the user. The trigger 53 is movable between a first position, and second or fully depressed position. The trigger 53 is depicted in FIG. 8 in its second position. The trigger 53 is biased toward the first position, and is mounted on the body 52 so that the user can pull or depress the trigger 53 using his or her index finger while grasping the elongated portion 54, as shown in FIGS. 1 and 8. The trigger 53 acts as a switch that, when fully depressed, closes to complete an electrical circuit, thereby causing the hand grip 51 to generate an electrical output. The output is relayed to the processor 18 via the bus 21, as denoted in FIG. 9. The hand grip 51 can include additional features, such as buttons (not shown) that facilitate control of the grippers 162, camera 163, and other operational features of the arm 160.

The use of the hand grip 51 as the user interface for the input device 50 is described for exemplary purposes only. Other types of user interfaces, such as a data glove, joystick, Wii™ controller, etc. can be used in the alternative.

The control unit 10 also comprises a first, second, and third sensor module designated by the respective reference characters 64, 66, 68. The sensor modules 64, 66, 68 are illustrated in FIG. 6. Each sensor module 64, 66, 68 comprises a rotary position sensor 70, shown schematically in FIG. 9. The rotary position sensors 70 can be, for example, potentiometers. The first, second, and third sensor modules 64, 66, 68 are coupled to, and receive mechanical inputs from the respective first, second, and third linkages 56, 58, 60, as discussed below.

Each sensor module 64, 66, 68 also includes an electric motor 72, depicted in FIGS. 6 and 9. Each motor 72 is mechanically coupled to an associated one of the lower bars 78, so that the motor 72, when activated, exerts a torque on the associated lower bar 78. The controller 16 is configured to cause the processor 18 to issue control inputs to selectively activate the motors 72, so that each motor 72 exerts a torque on its associated lower bar 78 in response to displacement of the lower bar 78. The controller 16 regulates the individual torques generated by the motors 72 so that the net resistive force acting on the hand grip 51 is proportional to the displacement of the hand grip 51. The resistive forces act as haptic feedback to the user as the user moves the hand grip 51. The controller 16 can be further configured so that additional force is exerted on the grip 51 when the vehicle 12 approaches or collides with an obstacle, to assist the use in avoiding and maneuvering around the obstacle. Alternative embodiments of the control unit 12 can be configured to operate without haptic feedback.

The first, second, and third linkages 56, 58, 60 are substantially identical. The following description of the first linkage 56 applies equally to the second and third linkages 58, 60, unless otherwise indicated.

The first linkage 56, as noted above, comprises two substantially identical upper bars 76, a lower bar 78, and a two couplers 82a, 82b. The upper bars 76 are connected to the lower bar 78 by way the coupler 82a. In particular, a first or upper end of the lower bar 78 is coupled to the coupler 82a by way of a single, transversely-extending pin 86 that permits the lower bar 78 to rotate about a first axis in relation to the coupler 82. This feature can be seen in FIG. 7. A second or lower end of each upper bar 76 is coupled to the coupler 82a by respective pins 87 that permit each of the upper bars 76 to rotate about an associated second axis in relation to the coupler 82a. The second axes are substantially perpendicular to the first axis. The upper bars 76, therefore, can articulate in relation to the lower bar 78 about two substantially perpendicular axes.

Figure 7:
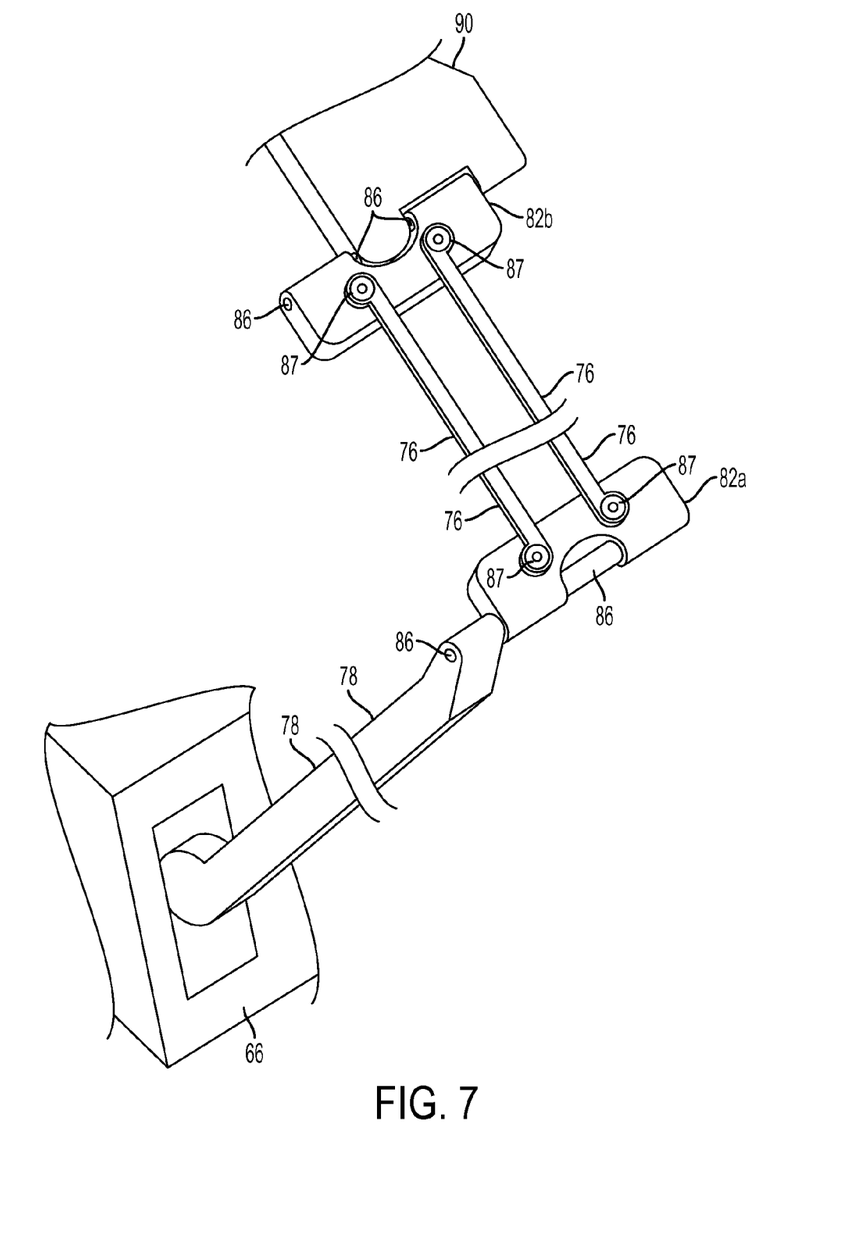
FIG. 7 is a magnified view of the area designated "B" in FIG. 6.

The upper bars 76 are connected to the hand grip 51 by way of the coupler 82b. In particular, a second or upper end of each upper bar 76 is coupled to the coupler 82b by additional pins 87 that permit each of the upper bars 76 to rotate about an associated third axis in relation to the coupler 82b, as shown in FIG. 7. The coupler 82b is connected to a flange 90 via a single, transversely-extending pin 86 that permits the coupler 82b to rotate about a fourth axis in relation to the flange 90. The fourth axis is substantially perpendicular to the third axes. The upper bars 76, therefore, can articulate in relation to the flange 90 and the grip 51 about two substantially perpendicular axes. The flange 90 is secured to the body 52 of the grip 51 as shown in FIG. 8.

A lower or second end of the lower bar 78 is connected to a shaft extending from the motor 72 of the first sensor module 64, so that torque can be transferred from the motor 72 to the lower bar 78 by way of the shaft. The rotary position sensor 70 of the first sensor module 64 is configured to measure the angular displacement of the shaft.

The position sensor 70 generates an electrical output indicative of the angular displacement of the second end of the lower bar 78 in relation to the first sensor module 64. The output of the position sensor 70 is transmitted to the processor 18 by way of the bus 21. The motor 72 of the first sensor module 64, as noted above, is configured to exert a torque on the lower bar 78 of the first linkage 56, in response to the angular displacement of the lower bar 78 as measured by the position sensor 70.

The first, second, and third sensor modules 64, 66, 68 are mounted on the casing 28 as shown in FIG. 6, and are positioned so that the lower bars 78 of the first, second, and third linkages 56, 58, 60 are angularly spaced from each other by approximately 120 degrees. In addition, the respective angular or clock positions at which the upper bars 76 of the first, second and third linkages 56, 58, 60 are connected to the flange 90 are offset from each other by approximately 120 degrees.

Movement of the hand grip 51 is transmitted to the position sensors 70 of the first, second, and third sensor modules 64, 66, 68 by way of the respective first, second, and third linkages 56, 58, 60, and results in rotation of the second ends of the lower bar 78. This rotational movement is sensed by the position sensors 70 of the first, second, and third sensor modules 64, 66, 68. Each position sensor 70, as noted above, generates an output responsive to the rotational input thereto.

The output of each position sensor 70 is transmitted to the controller 16 via the bus 21. The controller 16 resolves the outputs of the position sensors 70 into a vector indicative of the direction and magnitude of the displacement of the hand grip 51 in the x-y plane. This vector is hereinafter referred to as the "displacement vector." The "x," "y," and "z" directions are denoted by the coordinate system 94 depicted in FIG. 6.

The controller 16 is configured to "map" the movement of the hand grip 51, as represented by the displacement vector, to a desired or target displacement of the vehicle 12 along the ground. Once the controller 16 has mapped the movement of the hand grip 51 to the target displacement of the vehicle 12 along the ground, the controller 16 generates commands that effectuate the target displacement through the selective activation of the motors 116, 118.

The controller 16 maps the movement of the hand grip 51 to a desired or target movement of the vehicle 12 by recognizing left and right, or +/−y-direction movement of the hand grip 51 as a command to turn the vehicle 12 left or right, provided the trigger 53 is depressed while the hand grip 51 is being moved. The controller 16 likewise recognizes forward and rearward, or +/−x-direction movement of the hand grip 51 as a command for the vehicle 12 to move forward or backward, provided the trigger 53 is depressed while the hand grip 51 is being moved. Movement of the hand grip 51 while the trigger 53 is not depressed is not interpreted as a "move" command, and does not have any effect on the vehicle 12.

Thus, pure turning movement can be achieved by moving the hand grip 51 exclusively to the right or left while depressing the trigger 53. Pure linear movement in the forward or rearward direction can be achieved by moving the hand grip 51 exclusively forward and rearward while depressing the trigger 53. A combination of turning movement and forward or rearward movement can be achieved by moving the hand grip 51 both to the left or right, and forward or rearward while depressing the trigger 53.

In alternative embodiments, the controller 16 can be configured to recognize other types of movement of the hand grip 51 as commands for linear and turning movement of the vehicle 12. For example, alternative embodiments can be configured so that turning movement of the vehicle 12 is effectuated by rotation, rather than lateral movement, of the hand grip 51.

The controller 16 maps the movement of the hand grip 51 to the magnitude of the target displacement of the vehicle 12 through the use of a variable scale factor. The scale factor is a multiplier that relates the magnitude of the displacement of the hand grip in a particular direction to the magnitude of the target displacement of the vehicle 12 in that direction. The scale factor can be expressed as the ratio of the target linear and angular displacement of the vehicle 12 to the respective magnitudes of the displacement vector in the x and y directions.

The controller 16 is configured so that the scale factor can be varied by the user. In particular, the controller 16 includes a suitable means, such as a potentiometer 92 depicted schematically in FIG. 9, that permits the user to provide a variable control input that results in a change in the scale factor. The scale factor can be set relatively low when a relatively high degree of precision in the positioning of the vehicle 12 is required, such as when the vehicle 12 is approaching a suspected explosive device during EOD operations. A low scale factor can increase the precision with which the vehicle 12 can be maneuvered, since movement of the hand grip 51 will result in relatively small movements in the vehicle 12. The scale factor can be set relatively high when high-precision maneuvering is not needed, such as when the vehicle 12 needs to travel a relatively large distance absent the presence of obstacles.

Once the controller 16 has mapped the movement of the hand grip 51 to a target displacement of the vehicle 12 along the ground, the controller 16 generates commands that effectuate the target displacement through the selective activation of the motors 116, 118. The commands are relayed to the controller 139 of the vehicle 12 by way of the respective transceivers 46, 156 of the control unit 10 and the vehicle 12. In response to the commands, the controller 139 generates outputs that result in the activation of one or both of the motors 116, 118. The motors 116, 118 are activated in a direction, at a speed, and for a period of time needed to achieve the desired linear and/or angular displacement of the vehicle 12. As discussed above, linear or straight-line travel of the vehicle 12 can be effectuated by the simultaneous activation of both of the motors 116, 118 in the same direction. Turning of the vehicle 12 is achieved, for example, by simultaneously operating the motors 116, 118 in opposite directions. The vehicle 12 tracks its linear and angular displacement as described above, using the counters 155. The displacement information is continually relayed to the controller 16 by way of the transceivers 46, 156. The controller 16 uses this information as feedback, and effectuates closed-loop control of the displacement of the vehicle 12.

A user can effectuate movement of the vehicle 12 between a first and a second location by, for example, turning the vehicle 12 so that the front of the vehicle 12 faces the second location. The desired turning movement can be achieved by moving the hand grip 51 to the left or right while pressing the trigger 53. The user can then move the hand grip 51 forward, i.e., in the +x direction, while pressing the trigger 53, to cause the vehicle to translate forwardly, toward the second location. In situations where the distance to be traversed by the vehicle 12 is relatively large, the user may need to release the trigger 53 after the hand grip 51 has been moved all the way forward, move the hand grip 51 rearward, and then again move the hand grip 51 forward while pressing the trigger 53 to continue the forward movement of the vehicle 12. Fine adjustments in the position of the vehicle 12 as the vehicle 12 approaches the second location can be made though relatively small movements of the hand grip 51. Moreover, as discussed above, the scale factor can be set relatively low as the vehicle 12 approaches its final position, to facilitate fine adjustments in the position of the vehicle 12.

Movement of the hand grip 51 in the x-y plane thus results in a corresponding displacement of the vehicle 12 along the ground. It is believed that controlling the movement of the vehicle 12 in this manner can effectuate more precise control of the position of the vehicle 12 than can be achieved using other control methodologies such as velocity control. For example, it is believed that directly controlling the displacement of the vehicle 12 via movement of an input device such as the hand grip 51 can provide the user with a more intuitive feel for the positioning of the vehicle 12, since the parameter being controlled, the displacement of the vehicle 12, is itself being controlled through a control input in the form of a displacement, i.e., the displacement of the hand grip 51. It is also believed that the use of displacement control can reduce or eliminate the need to incrementally "creep up" on a desired final position by repeatedly jogging the input device to chase a velocity necessary to place the vehicle 12 in the final position. The positive and precise control the vehicle 12 that can be achieved using displacement control can be of particular value, for example, in applications such as EOD, and in situations where constraints exist in visibility, maneuvering space, time, etc.

The control unit 10 is further configured to provide the user with the option to effectuate movement of the vehicle 12 by controlling the velocity of the vehicle 12 via movement of the hand grip 12. In particular, control unit 10 includes a switch 99, shown schematically in FIG. 9, that permits the user to toggle between velocity control and the above-described displacement control. Velocity control can be used, for example, when relatively large changes in the position of the vehicle 12 are desired. The user can switch to displacement control when approaching the desired end position of the vehicle, to precisely control the movement during the final stage of its movement. The controller 16, when operating in the velocity-control mode, regulates the velocity of the vehicle 12 by regulating the speed of the motors 116, 118 in proportion to the displacement of the hand grip 51.

The switch 99 can be configured to provide an additional input to the controller 16 that causes the controller 16 to control the position of the articulating arm 160 in response to movement of the hand grip 51. The controller 16 can be configured to control the movement of the arm 160 in a manner substantially similar to the manner in which the displacement of the vehicle 12 is controlled. In particular, the controller 16 can be configured to determine a target movement of the arm 160 based on a relationship between the displacement of the hand grip 51 and the target movement of the arm 160, and to generate additional control inputs that, when received by the controller 139 of the unmanned vehicle 12, cause the controller 139 to generate control inputs that cause the arm 160 to move so as to substantially attain the target displacement. Alternative embodiments of the control unit 12 can be configured with a separate input device for controlling movement of the arm 160.

As discussed above, the inventive concepts disclosed herein can be applied to remotely-controlled and remotely-guided unmanned vehicles such as unmanned aerial vehicles, including unmanned rotary-wing vehicles and unmanned combat air vehicles; unmanned undersea vehicles; unmanned surface vehicles; etc. In such applications, the control unit 12 can be configured to generate control inputs that affect the operation of moving elements on the unmanned vehicle, such as rotor blades, ailerons, rudders, elevators, propellers, etc., so that the unmanned vehicle substantially attains a target displacement determined by the control unit 12 in response to a user input provided to the control unit 12 via the input device 50.

What is claimed is:

1. A system, comprising an unmanned vehicle and a control unit communicatively coupled to the unmanned vehicle:
   the unmanned vehicle comprising:
      a body;
      a movable element coupled to the body;
      an actuating device operable to move the movable element; and
      a first controller communicatively coupled to the actuating device and being operable to activate and deactivate the actuating device in response to control inputs generated by the control unit;
   the control unit comprising:
      an input device configured to move in response to a user input;
      a sensor operable to sense movement of the input device; and
      a second controller communicatively coupled to the sensor; the second controller operable to:
         determine a displacement of the input device based on inputs from the sensor;
         determine a target displacement of the unmanned vehicle based on a relationship between the displacement of the input device and the target displacement of the unmanned vehicle; and
         generate the control inputs for the unmanned vehicle; and
   the control inputs, when received by the unmanned vehicle, cause the unmanned vehicle to substantially attain the target displacement.

2. The system of claim 1, wherein: the movable element comprises a plurality of wheels mounted for rotation on the body; and the actuating device comprises one or more motors.

3. The system of claim 2, wherein the vehicle further comprises at least one track configured to be driven by the one or more wheels.

4. The system of claim 1, wherein the control unit is configured so that the relationship between the displacement of the input device and the target displacement of the unmanned vehicle can be varied by the user.

5. The system of claim 1, wherein the second controller is operable to determine the target displacement of the unmanned vehicle based on a ratio of the target displacement to the displacement of the input device.

6. The system of claim 1, wherein the unmanned vehicle further comprises:
   a sensor operable to determine an actual displacement of the unmanned vehicle; and
   a transceiver operable to transmit the actual displacement of the unmanned vehicle to the control unit.

7. The system of claim 1, wherein the control inputs generated by the second controller cause the vehicle to translate linearly in response to movement of the hand grip in a first direction, and to turn in response to linear movement of the hand grip in a second direction substantially perpendicular to the first direction.

8. The system of claim 1, wherein the control inputs generated by the second controller cause the vehicle to translate linearly in response to linear movement of the hand grip in a first direction, and to turn in response to turning of the hand grip.

9. The system of claim 1, wherein the unmanned vehicle and the control unit are communicatively coupled by way of a wireless communication link.

10. The system of claim 9, wherein the switch is a trigger biased toward the first position.

11. The system of claim 1, wherein the input device further comprises a switch communicatively coupled to the second controller and movable between a first and a second position; and the input device is configured to provide the control inputs to the unmanned vehicle only when the switch is in the second position.

12. The system of claim 1, wherein:
the first controller is operable to determine a target velocity of the unmanned vehicle based on a relationship between the displacement of the input device and the target velocity of the unmanned vehicle, and to generate additional control inputs for the unmanned vehicle; and
the additional control inputs, when received by the unmanned vehicle, cause the unmanned vehicle to substantially attain the target velocity.

13. The system of claim 1, wherein:
the unmanned vehicle further comprises an arm mounted on the body and communicatively coupled to the first controller;
the first controller is operable to determine a target movement of the arm based on a relationship between the displacement of the input device and the target movement of the arm, and to generate additional control inputs for the unmanned vehicle; and
the unmanned vehicle is configured so that the additional control inputs, when received by the unmanned vehicle, cause the arm to move in response to the movement of the input device.

14. The system of claim 1, wherein the input device comprises: a hand grip; and one or more linkages mechanically coupled to the hand grip and the one or more sensors and configured to transmit movement of the hand grip to the one or more sensors.

15. The system of claim 14, wherein:
each of the linkages comprises: a first arm; a second arm mechanically coupled to one of the sensors; a first coupler that mechanically couples the first and second arms, the first coupler being configured so that the first arm can rotate in relation to the second arm about a first and a substantially perpendicular second axis; and a second coupler that mechanically couples the first arm to the grip, the second coupler being configured so that the first arm can rotate in relation to the grip about a third and a substantially perpendicular fourth axis; and
the second arms are angularly spaced by approximately 120°.

16. The system of claim 15, wherein:
the control unit further comprises three motors communicatively coupled to the second controller, each of the motors of the control unit being mechanically coupled to a respective one of the lower arms and being operable to generate a torque on the lower arm; and
the second controller is operable to selectively activate the motors of the control unit so that the torques generated by the motors of the control unit form a net force on the grip.

17. The system of claim 16, wherein:
the second controller is operable to determine the target displacement of the unmanned vehicle based on a relationship between the target displacement of the unmanned vehicle, and the displacement of the input device in a plane extending in a first direction and a second direction substantially perpendicular to the first direction; and
the second controller is further operable to selectively activate the motors of the control unit so that the net resistive force on the grip further resists movement of the grip in a third direction substantially perpendicular to the first and second directions.

18. A system, comprising a control unit and an unmanned vehicle communicatively coupled to the control unit, wherein:
the control unit comprises:
an input device configured to move in response to a user input;
a sensor coupled to the input device and being operable to generate an output related to the movement of the input device; and
a first controller operable to determine a target displacement of the unmanned vehicle based on the outputs of the sensor, and to generate a control input related to the target displacement; and
the unmanned vehicle comprises:
a body;
a movable element mounted on the body and operable to affect a displacement of the unmanned vehicle;
an actuating device operable to move the movable element; and
a second controller operable to activate the actuating device in response to the control input of the first controller to effectuate the target displacement of the unmanned vehicle.

19. The system of claim 18, wherein the second controller is configured so that the control input of the first controller, when received by the second controller, cause the second controller to generate a control input for the one or more actuating devices, the control input generated by the second controller causing the one or more actuating devices to move the movable element so that the unmanned vehicle substantially attains the target displacement.

20. The system of claim 18, wherein the unmanned vehicle is an unmanned ground vehicle.

21. The system of claim 18, wherein: the movable element comprises a plurality of wheels mounted for rotation on the body; and the actuating device comprises one or more motors.

22. The system of claim 18, wherein the unmanned vehicle and the control unit are communicatively coupled by way of a wireless communication link.

23. A control unit for use with an unmanned vehicle, comprising:
an input device movable in response to a user input;
one or more sensors coupled to the input device and generating an output related to the movement of the input device; and
a first controller generating a control input for the unmanned vehicle based on a target displacement of the unmanned vehicle, the target displacement determined based on a relationship between a displacement of the input device and the target displacement of the unmanned vehicle;
wherein the control input, when received by the unmanned vehicle, causes a second controller to control the unmanned vehicle such that the unmanned vehicle substantially attains the target displacement.

* * * * *